(12) United States Patent
Klesyk

(10) Patent No.: US 9,399,402 B2
(45) Date of Patent: Jul. 26, 2016

(54) PROXIMITY DETECTION CIRCUIT FOR ON-BOARD VEHICLE CHARGER

(75) Inventor: Krzysztof Klesyk, Novi, MI (US)

(73) Assignee: Lear Corporation, Southfield, MI (US)

( * ) Notice: Subject to any disclaimer, the term of this patent is extended or adjusted under 35 U.S.C. 154(b) by 1018 days.

(21) Appl. No.: 13/091,214

(22) Filed: Apr. 21, 2011

(65) Prior Publication Data

US 2012/0268065 A1 Oct. 25, 2012

(51) Int. Cl.
*H02J 7/00* (2006.01)
*B60L 11/18* (2006.01)

(52) U.S. Cl.
CPC ......... *B60L 11/1818* (2013.01); *B60L 11/1868* (2013.01); *B60L 2230/12* (2013.01); *B60L 2240/80* (2013.01); *Y02T 10/7005* (2013.01); *Y02T 10/7066* (2013.01); *Y02T 10/7088* (2013.01); *Y02T 90/121* (2013.01); *Y02T 90/14* (2013.01)

(58) Field of Classification Search
USPC .......................................................... 320/109
See application file for complete search history.

(56) References Cited

U.S. PATENT DOCUMENTS

| | | | |
|---|---|---|---|
| 4,439,819 A | 3/1984 | Regan | |
| 4,662,232 A | 5/1987 | Gonsalves et al. | |
| 4,897,662 A | 1/1990 | Lee et al. | |
| 5,012,113 A * | 4/1991 | Valentine | H04B 10/11 136/291 |
| 5,151,645 A | 9/1992 | Murata | |
| 5,617,466 A * | 4/1997 | Walance | H04M 3/30 379/21 |
| 5,978,236 A | 11/1999 | Faberman et al. | |
| 6,393,571 B1 * | 5/2002 | Huckfeldt | G06F 1/32 713/300 |
| 6,459,247 B1 | 10/2002 | Benes | |
| 6,662,123 B2 | 12/2003 | Maeckel et al. | |
| 6,724,593 B1 | 4/2004 | Smith | |
| 6,905,362 B2 | 6/2005 | Williams | |
| 6,963,186 B2 | 11/2005 | Hobbs | |
| 7,253,584 B2 | 8/2007 | Souther et al. | |
| 7,279,805 B2 | 10/2007 | Senda et al. | |
| 7,411,371 B2 | 8/2008 | Hobbs | |
| 7,506,182 B2 | 3/2009 | Taniguchi et al. | |
| 7,579,807 B2 | 8/2009 | Funabashi et al. | |
| 7,791,217 B2 | 9/2010 | Kamaga | |
| 7,878,866 B1 | 2/2011 | Kwasny et al. | |
| 7,923,161 B2 | 4/2011 | Hirakata | |
| 8,109,139 B2 * | 2/2012 | Wagner | B60C 23/044 702/77 |
| 8,244,422 B2 | 8/2012 | Fujitake | |
| 8,450,980 B2 | 5/2013 | Kumar et al. | |

(Continued)

FOREIGN PATENT DOCUMENTS

| | | |
|---|---|---|
| CN | 1351775 A | 5/2002 |
| CN | 1870374 A | 11/2006 |

(Continued)

OTHER PUBLICATIONS

Chinese Patent Application No. 201210114874.0, Office Action dated Mar. 3, 2014.

(Continued)

*Primary Examiner* — Richard Isla Rodas
*Assistant Examiner* — David V Henze-Gongola
(74) *Attorney, Agent, or Firm* — Brooks Kushman P.C.

(57) ABSTRACT

A proximity detection circuit is operable to detect connection of a cordset to a vehicle charging system or connection of another device to some other electrical circuit where it may be desirable to facilitate detection while a controller or other current drawing source is inactive.

18 Claims, 4 Drawing Sheets

(56) References Cited

U.S. PATENT DOCUMENTS

| | | |
|---|---|---|
| 8,749,198 B2 | 6/2014 | Klesyk |
| 8,791,666 B2 | 7/2014 | Yokoyama et al. |
| 8,945,735 B2 | 2/2015 | Kim |
| 2002/0041174 A1 | 4/2002 | Purkey |
| 2002/0081486 A1 | 6/2002 | Williams |
| 2004/0125626 A1 | 7/2004 | Kanouda et al. |
| 2004/0130288 A1 | 7/2004 | Souther et al. |
| 2004/0169489 A1 | 9/2004 | Hobbs |
| 2005/0141163 A1 | 6/2005 | Franke et al. |
| 2005/0212438 A1 | 9/2005 | Senda et al. |
| 2006/0028178 A1 | 2/2006 | Hobbs |
| 2006/0267410 A1 | 11/2006 | Kanouda et al. |
| 2007/0132457 A1 | 6/2007 | Okamoto et al. |
| 2008/0136371 A1 | 6/2008 | Sutardja |
| 2008/0205086 A1 | 8/2008 | Darroman et al. |
| 2009/0026837 A1 | 1/2009 | Lee |
| 2009/0033253 A1 | 2/2009 | Nagashima et al. |
| 2009/0034308 A1 | 2/2009 | Welchko et al. |
| 2009/0160255 A1 | 6/2009 | Grady |
| 2009/0224724 A1* | 9/2009 | Ma et al. ............... 320/109 |
| 2009/0246596 A1 | 10/2009 | Sridhar et al. |
| 2009/0322257 A1 | 12/2009 | Kim et al. |
| 2010/0017249 A1 | 1/2010 | Fincham et al. |
| 2010/0078997 A1 | 4/2010 | Chen et al. |
| 2010/0097031 A1 | 4/2010 | King et al. |
| 2010/0110741 A1 | 5/2010 | Lin et al. |
| 2010/0141203 A1 | 6/2010 | Graziano et al. |
| 2010/0165668 A1 | 7/2010 | Lin |
| 2010/0215994 A1 | 8/2010 | Kim |
| 2010/0225274 A1 | 9/2010 | Fujitake |
| 2010/0228413 A1* | 9/2010 | Fujitake ............ B60L 11/14 701/22 |
| 2010/0292890 A1 | 11/2010 | Morris |
| 2010/0295507 A1 | 11/2010 | Ishii et al. |
| 2010/0299008 A1 | 11/2010 | Mitsutani |
| 2011/0029144 A1 | 2/2011 | Muller et al. |
| 2011/0057604 A1* | 3/2011 | Capella ............ H02J 7/0004 320/107 |
| 2011/0057611 A1 | 3/2011 | Nakaso et al. |
| 2011/0095728 A1* | 4/2011 | Chen et al. ............. 320/162 |
| 2011/0121779 A1 | 5/2011 | Ichikawa et al. |
| 2011/0163722 A1 | 7/2011 | Gale et al. |
| 2011/0166725 A1 | 7/2011 | Booth et al. |
| 2011/0169447 A1 | 7/2011 | Brown et al. |
| 2011/0199048 A1 | 8/2011 | Yokoyama et al. |
| 2011/0202192 A1 | 8/2011 | Kempton |
| 2011/0204845 A1 | 8/2011 | Paparo et al. |
| 2011/0210698 A1 | 9/2011 | Sakai |
| 2012/0049796 A1 | 3/2012 | Fukatsu |
| 2013/0026827 A1 | 1/2013 | Hampo et al. |
| 2013/0119755 A1 | 5/2013 | Klesyk |
| 2013/0120889 A1 | 5/2013 | Klesyk |

FOREIGN PATENT DOCUMENTS

| | | | |
|---|---|---|---|
| CN | 101115632 A | 1/2008 | |
| CN | 201122850 Y | 9/2008 | |
| CN | 201345044 Y | 11/2009 | |
| CN | 101777779 A | 7/2010 | |
| CN | 201528214 A | 7/2010 | |
| CN | 101801711 A | 8/2010 | |
| CN | 101814725 A | 8/2010 | |
| CN | 101895140 A | 11/2010 | |
| CN | 102005789 | 4/2011 | |
| CN | 102037625 | 4/2011 | |
| CN | 102085861 | 6/2011 | |
| CN | 102104280 | 6/2011 | |
| CN | 102195224 A | 9/2011 | |
| DE | 202006020319 U1 | 5/2008 | |
| DE | 202008005682 U | 2/2009 | |
| DE | 102008047502 A1 | 4/2010 | |
| KR | 20070064851 A | 6/2007 | |
| WO | 2007081531 A2 | 7/2007 | |
| WO | WO 2009037966 A1 * | 3/2009 | ............. B60L 11/14 |
| WO | 2010035676 A1 | 4/2010 | |

OTHER PUBLICATIONS

Chinese Patent Application No. 201210114874.0, Third Office Action dated Feb. 13, 2015.
Office Action for U.S. Appl. No. 13/192,559 dated Jun. 13, 2014.
Notice of Allowance for U.S. Appl. No. 13/192,559 dated Oct. 27, 2014.
Office Action for U.S. Appl. No. 13/294,423 dated Nov. 12, 2014.
Office Action for U.S. Appl. No. 13/192,559 dated Dec. 24, 2014.
Office Action for U.S. Appl. No. 13/192,559 dated May 7, 2015.
Notice of Allowance for U.S. Appl. No. 13/294,423 dated Aug. 10, 2015.
Notice of Allowance for U.S. Appl. No. 13/192,559 dated Sep. 10, 2015.
Notice of Allowance for U.S. Appl. No. 13/293,343 dated Sep. 9, 2015.
Corrected Notice of Allowance for U.S. Appl. No. 13/192,559 dated Oct. 22, 2015.
Corrected Notice of Allowance for U.S. Appl. No. 13/192,559 dated Nov. 6, 2015.
United States Patent and Trademark Office, Notice of Allowance and Fee(s) Due for U.S. Appl. No. 13/294,423 mailed May 6, 2016.
United States Patent and Trademark Office, Office Action for U.S. Appl. No. 14/955,483 dated Mar. 14, 2016.

* cited by examiner

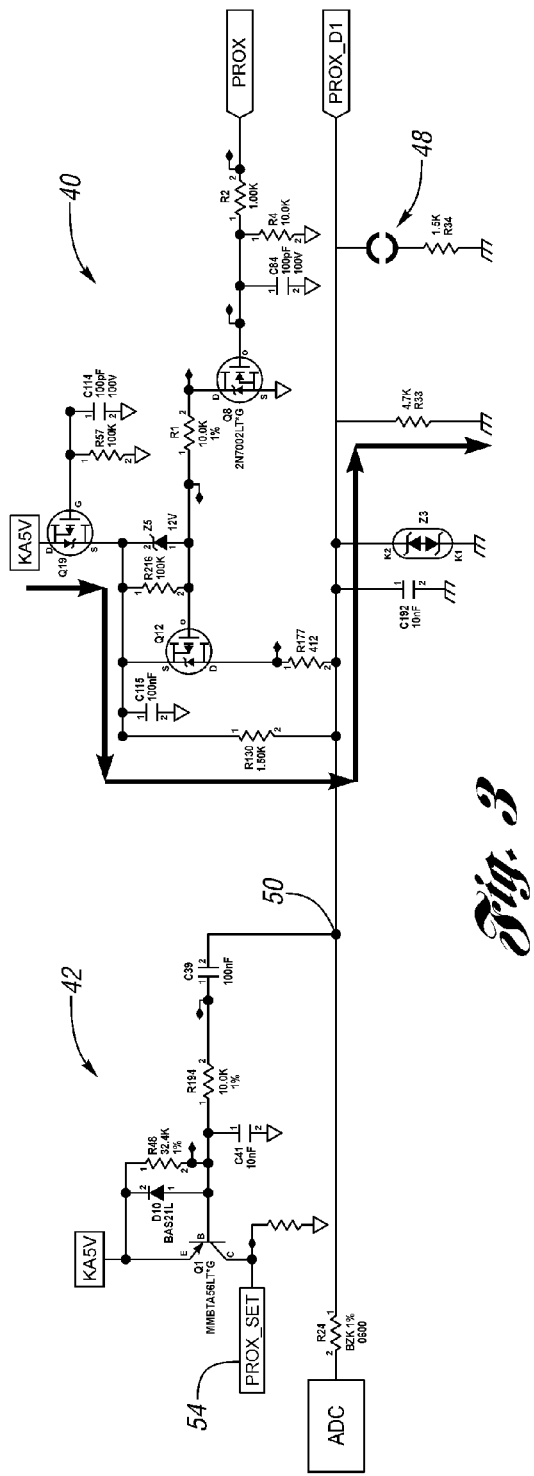
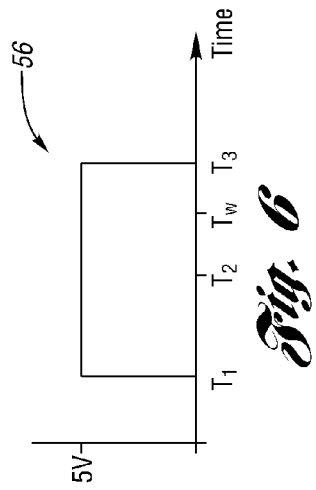
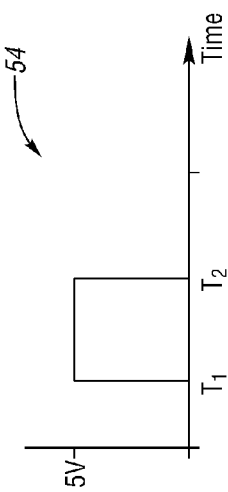

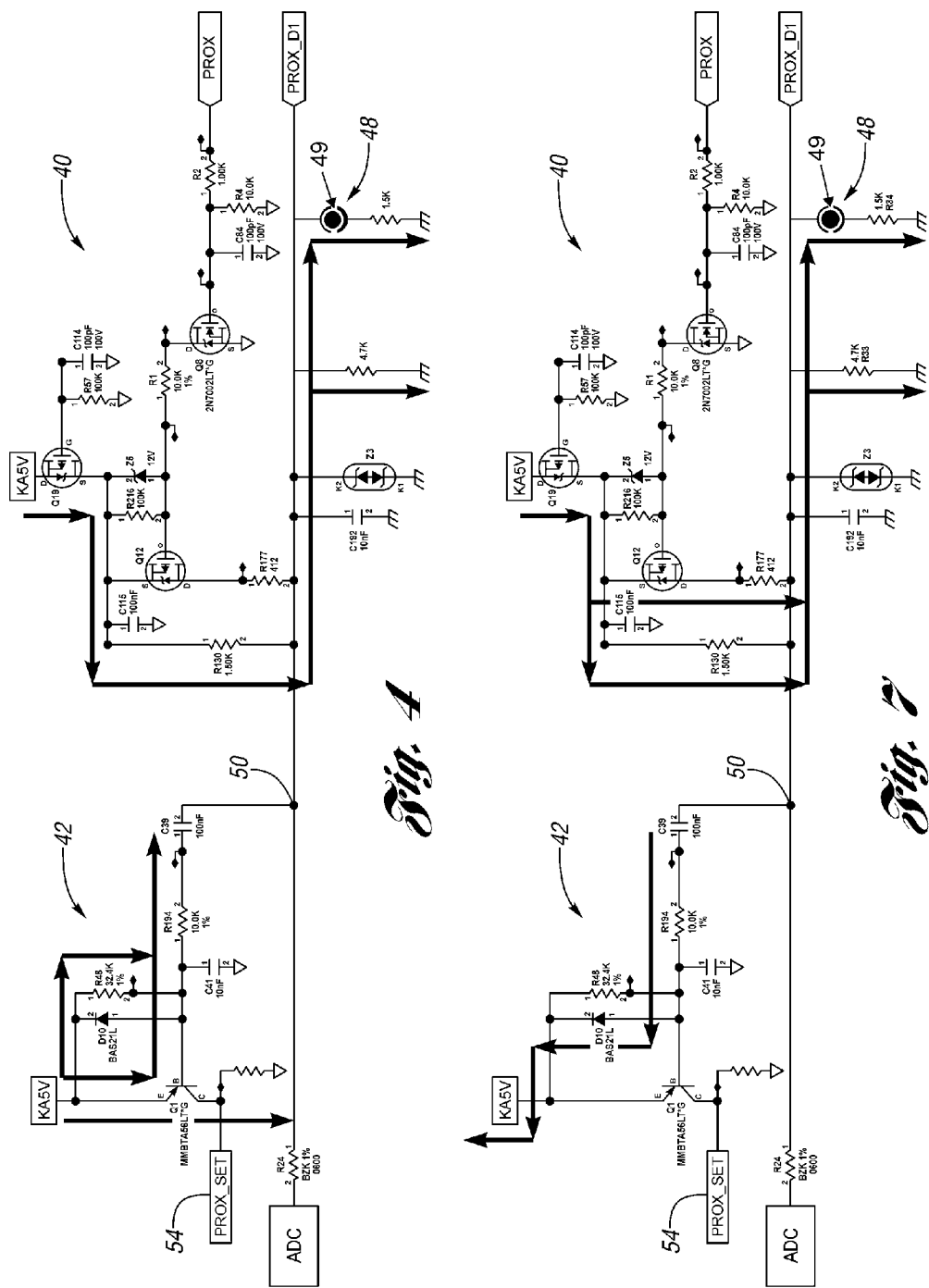

PROXIMITY DETECTION CIRCUIT FOR ON-BOARD VEHICLE CHARGER

TECHNICAL FIELD

The present invention relates to proximity detection circuits of the type suitable for use with on-board vehicle chargers to detect connection to a cordset or other element used to facilitate vehicle charging.

BACKGROUND

An on-board vehicle charger may be used to charge a high voltage battery found in a hybrid electric or electric vehicle to provide energy to an electrically powered motor. In some cases, the charging may be facilitated with a cordset or other element having capabilities to facilitate current delivery to the on-board charger, such as from a wall charger or other type of charging station. The cordset may include an adaptor to facilitate attachment to an outlet or other receptacle associated with the on-board charger. The on-board charger may include electronics or other elements to control and manage current flow to the high voltage battery and other the related charging operations.

SUMMARY

One non-limiting aspect of the present invention contemplates a proximity detection circuit for use in awakening a microcontroller to detect connection of a charging cordset to a receptacle of a vehicle charging system where the cordset has a proximity pin that plugs into a terminal of the receptacle when the cordset is connected. The proximity detection circuit may include: a wake-up signal generating circuit operable to generate a wake-up signal for awakening the microcontroller to detect connection of the charging cordset to the receptacle; and a connection circuit configured to conduct through the pin in order to enable the wake-up signal generating circuit to generate the wake-up signal.

One non-limiting aspect of the present invention contemplates the wake-up signal generating circuit being configured to generate the wake-up signal as a pulsed wake-up signal.

One non-limiting aspect of the present invention contemplates a duration of the pulsed wake-up signal being less than a signal duration needed to awaken the microcontroller.

One non-limiting aspect of the present invention contemplates a latching circuit being configured to elongate the duration of the pulsed wake-up signal to at least equal the signal duration needed to awaken the microcontroller.

One non-limiting aspect of the present invention contemplates the signal duration needed to awaken the microcontroller being at least 50 ms.

One non-limiting aspect of the present invention contemplates a duration of the pulsed wake-up signal being less than 50 ms.

One non-limiting aspect of the present invention contemplates the wake-up signal generation circuit being configured to include a capacitor operable to set a duration of the pulsed wake-up signal, wherein a capacitance of the capacitor less than 150 nF.

One non-limiting aspect of the present invention contemplates the connection circuit being operable between a first state and a second state, the first state corresponding with the connection circuit consuming a first amount of current and the second state corresponding with the connection circuit consuming a second amount of current where the second amount of current is greater than the first amount.

One non-limiting aspect of the present invention contemplates the connection circuit being operable between the first and second state according to controlling signals received from the microcontroller, the microcontroller controlling the connecting circuit to the first state upon determining disconnection of the cordset and to the second state upon determining connection of the cordset.

One non-limiting aspect of the present invention contemplates the first amount of current being less than 150 uA.

One non-limiting aspect of the present invention contemplates a proximity detection circuit for use in awakening a microcontroller to detect connection of a charging cordset to a vehicle charging system. The proximity detection circuit may include: a pulse signal generating circuit operable to generate a single-pulsed signal for use in awakening the microcontroller from a sleep state to an active state upon connection of the charging cordset to the vehicle charging system; and a connection circuit configured to enable the pulse signal generating circuit to generate the single-pulsed signal upon connection of the charging cordset to the vehicle charging system.

One non-limiting aspect of the present invention contemplates a latching circuit being configured to elongate the single-pulsed signal into a wake-up signal sufficient to awaken the microcontroller.

One non-limiting aspect of the present invention contemplates the pulse signal generating circuit being configured to include a capacitor operable to set a duration of the single-pulsed signal.

One non-limiting aspect of the present invention contemplates a capacitance of the capacitor being less than 150 nF.

One non-limiting aspect of the present invention contemplates the connection circuit including a voltage divider connected to the pulse generating circuit at a connection node, the voltage divider providing a first voltage at the connection node when the cordset is disconnected and a second voltage when the cordset is connected where the pulse generating circuit requires the second voltage in order to generate the single-pulsed signal.

One non-limiting aspect of the present invention contemplates the connection node coinciding with a terminal of the receptacle used to receive a proximity pin of the cordset, wherein the voltage divider is configured to conduct through the pin in order to provide the second voltage.

One non-limiting aspect of the present invention contemplates proximity detection circuit for use in awakening a microcontroller from a sleep state to an active state in order to detect connection of a charging cordset to a vehicle charging system. The proximity detection circuit may include: a pulse signal generating circuit operable to generate a first signal having a first duration; a latching circuit operable to process the first signal into a second signal having a second duration, the second duration sufficient for awakening the microcontroller from the sleep state to the active state; and a connection circuit configured to enable the pulse signal generating circuit to generate the first signal upon connection of the charging cordset to the vehicle charging system.

One non-limiting aspect of the present invention contemplates the first duration being insufficient to awaken the microcontroller from the first state to the second state.

One non-limiting aspect of the present invention contemplates the connection circuit conducting though a pin of the cordset in order to enable the pulse signal generating circuit.

One non-limiting aspect of the present invention contemplates the connection circuit including a voltage divider connected to the pulse generating circuit at a connection node, the voltage divider providing a first voltage at the connection node when the cordset is disconnected and a second voltage when the cordset is connected, wherein the pulse generating circuit requires the second voltage in order to generate the first signal and wherein the connection circuit consumes less than 150 uA through the voltage divider when providing the first voltage at the connection node.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 3 illustrates a current path through a connection and wake-up signal generating circuits when a cordset is disconnected in accordance with one non-limiting aspect of the present invention.

FIG. 4 illustrates current paths through the connection and wake-signal generating circuits when the cordset is initially connected in accordance with one non-limiting aspect of the present invention.

FIG. 5 illustrates a pulsed signal output from of the wake-up signal generating circuit in accordance with one non-limiting aspect of the present invention.

FIG. 6 illustrates a pulsed signal output from a latching circuit in accordance with one non-limiting aspect of the present invention.

FIG. 7 illustrates current paths through the connection and wake-signal generating circuits when the cordset is connected and additional resistance is added in accordance with one non-limiting aspect of the present invention

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
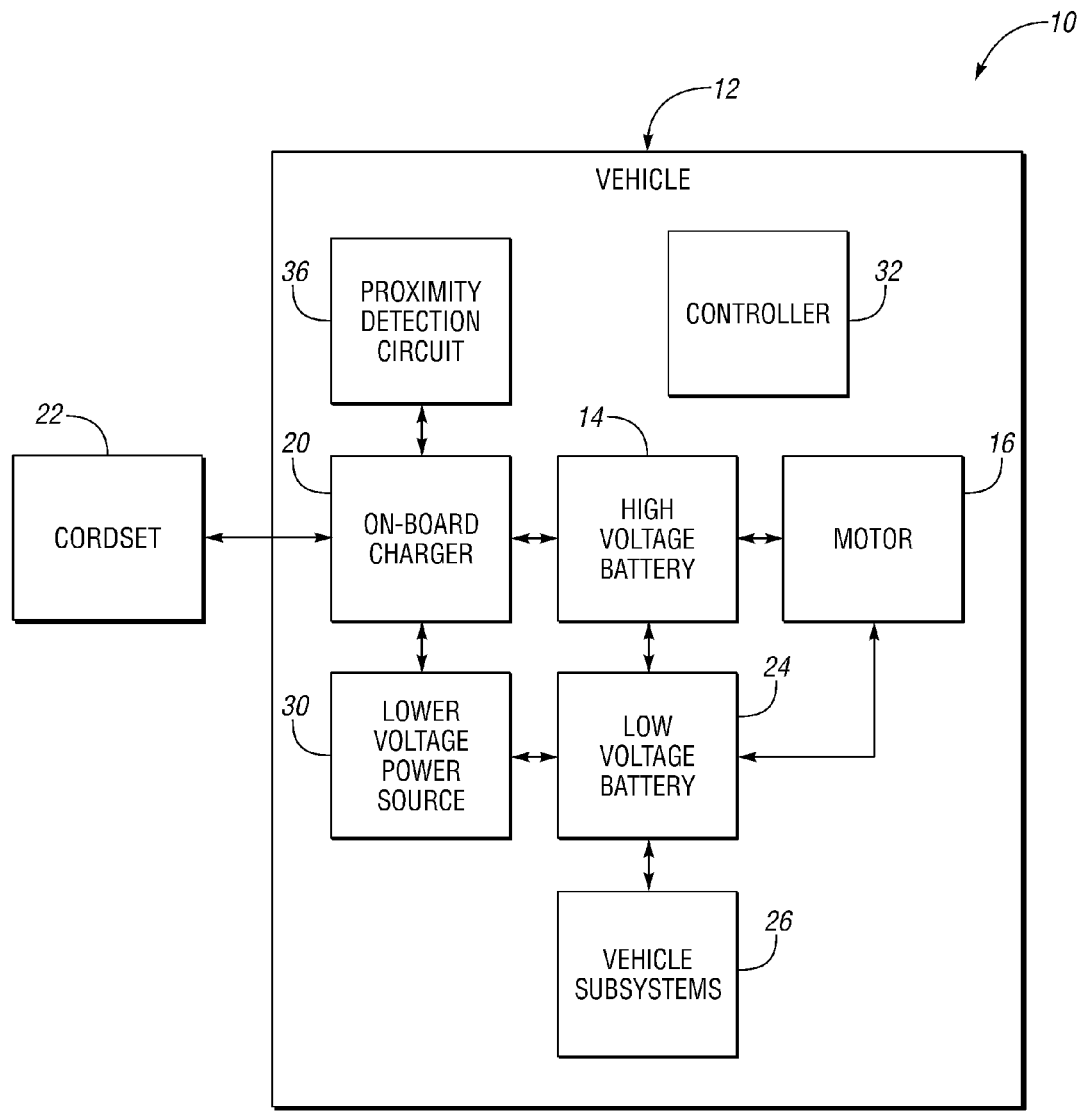
FIG. 1 functionally illustrates logical elements associated with a vehicle power system in accordance with one non-limiting aspect of the present invention.

FIG. 1 functionally illustrates logical elements associated with a vehicle power system 10 in accordance with one non-limiting aspect of the present invention. The vehicle power system 10 is shown and predominately described for use within an electric vehicle, hybrid electric vehicle, or other vehicle 12 having a high voltage battery 14 or other energy source operable to provide energy sufficient for use by an electric motor 16 to drive the vehicle 12. The vehicle 12 may include an on-board charger 20 to facilitate charging the high voltage battery 14 with current delivered through a cordset 22 used to connect the on-board charger to a wall charger or other charging station (not shown). The cordset 22 may be used to deliver current through a cable having a terminal (not shown) at one end adapted for receipt within a receptacle or outlet (not shown) associated with the on-board charger 20. U.S. Pat. No. 7,878,866, entitled Connector Assembly for Vehicle Charging, the disclosure of which is hereby incorporated by reference in its entirety herein, discloses a cordset 22 and receptacle arrangement that may be used in accordance with the present invention.

The on-board charger 20 may include electronics or other elements operable to control and manage current flow used to support charging related operations for the high voltage battery 14, and optionally, to support charging or otherwise powering a low voltage battery 24, one or more vehicle subsystem 26, and/or other electronically operable elements included within the vehicle 12. The low voltage battery 24 may be included to support powering vehicle systems 26 that operate at voltages lower than the electric motor 16, such as but not limited to remote keyless entry systems, heating and cooling systems, infotainment systems, braking systems, etc. In addition to being charged with energy provided through the cordset 22, one or more of the high and low voltage batteries 14, 24 and vehicle subsystems 26 may be operable to power each other and/or to be powered with energy generated by the electric motor 16.

The low voltage battery 24, for example, may be operable to provide energy sufficient for use by a lower voltage power source 30. The lower voltage power source 30 may be operable to regulate current from the low voltage battery 24 for use with one or more of the vehicle subsystems 26 and/or the on-board charger 20. A controller 32 may be included to facilitate executing logical operations and undertaking other processing requirements associated with controlling the on-board charger and/or controller system within the vehicle 12 (optionally, one or more of the elements may include their own controller or processor). For exemplary purposes, the terms 'lower,' 'low', and 'high' are used to differentiate voltage levels respectively coinciding with approximately 5 VDC, 12 VDC, and 200 VDC, which are commonly used within vehicles to support the operation associated with each of the corresponding energy sources. This is done without intending to unnecessarily limit the scope and contemplation of the present invention as the present invention fully contemplates the energy sources having the same or different voltage levels and/or current production/generation capabilities.

A proximity detection circuit 36 may be included in accordance with one non-limiting aspect of the present invention to facilitate a current conservative configuration operable to facilitate registering connection of the cordset 22 to the on-board charger 20 while the controller is in the sleep or inactive state. The proximity detection circuit 36 may be operable to transition the controller 32 from the sleep state to the active state, optionally while consuming less than 50-150 uA. This may be helpful in allowing the controller 32 to remain in a low energy consumption state (e.g., where the controller 32 is unable to detect connection of the cordset 22 or perform other operations) in order to limit the amount of consumed energy while still allowing the controller 32 to be awoken to perform its prescribed operations once the cordset 22 is connected or some other event takes places (the other events may relate to other triggering operations associated with capabilities that are unavailable while the controller 22 is in sleep mode).

Figure 2:
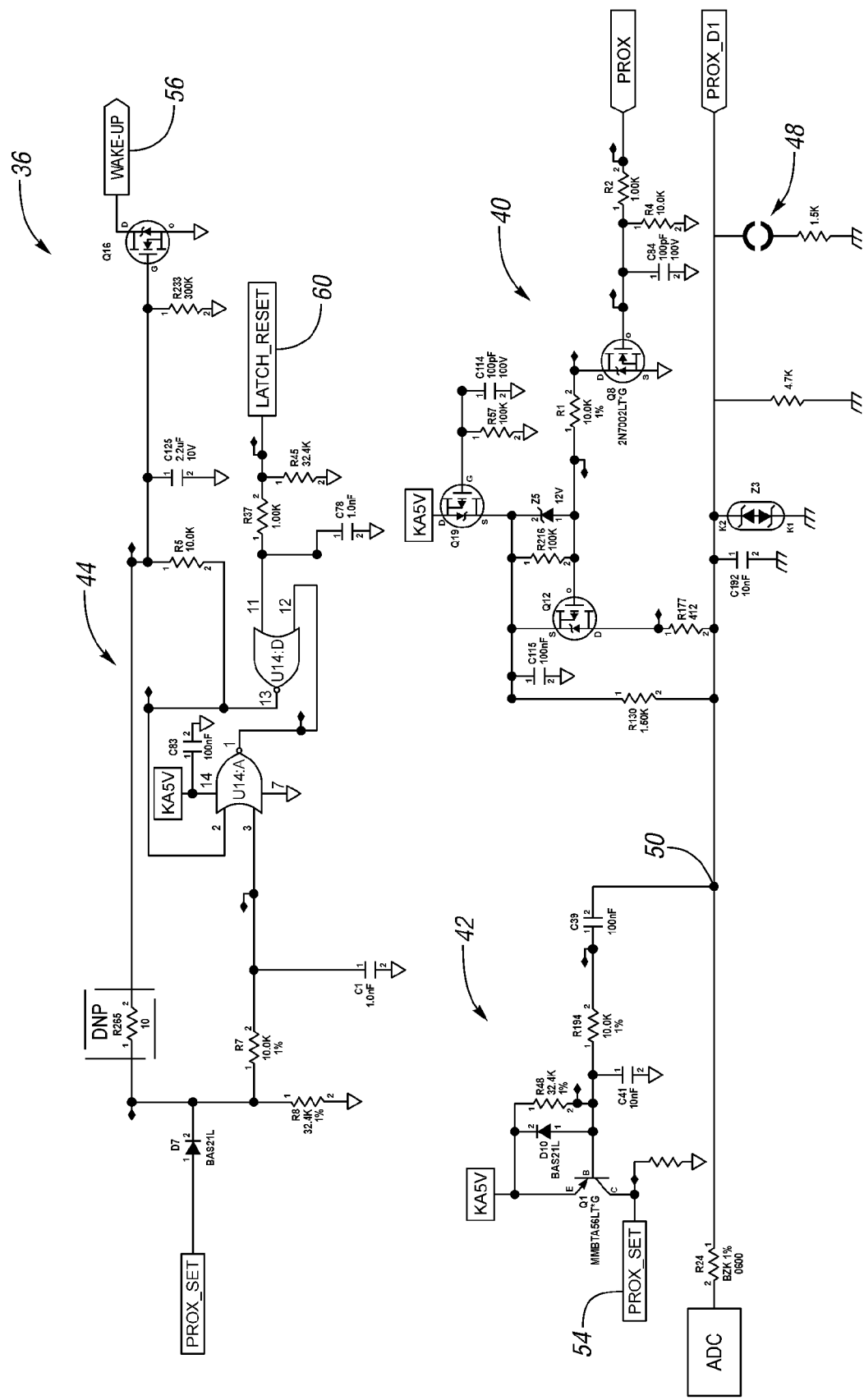
FIG. 2 schematically illustrates a proximity detection circuit in accordance with one non-limiting aspect of the present invention.

FIG. 2 schematically illustrates the proximity detection circuit 36 in accordance with one non-limiting aspect of the present invention. The proximity detection circuit 36 is intended to describe the operation of the circuit related elements (switches, resistors, capacitors, diodes, etc.) shown in FIG. 2. The values assigned to these elements and the described use of the elements is not intended to necessarily require that value/element or that the same is part of a dedicated circuit. Rather, the circuit elements may be part of any one or more of the logical elements shown in FIG. 1, i.e., some or all of the illustrated circuit components may be included in some or all of the on-board charger 20, the lower voltage power source 30, the vehicle subsystems 26, the controller 32, the motor 16, etc. While multiple circuit elements are shown to achieve certain results, the present invention fully contemplates the use of other circuit elements to achieve similar results, particularly the use of other current conservative elements.

The proximity detection circuit 36 is shown to be configured to operate with a constant 5 VDC power supply (KA5V), which may be provided by the lower voltage power source 30. The constant 5 VDC may be used to power switches and bias other elements of the circuit 36 while the controller is in either one of the sleep and/or active states. The configuration shown in FIG. 2 relies on the 5 VDC to power a connection circuit 40, a wake-up signal generating circuit 42, and an optional latching circuit 44. The connection generating circuit 40 may be configured to generate a signal, such as a voltage change, suitable for use in prompting the wake-up signal generating circuit 42 to output a pulsed signal for use in awakening the controller 32. In the event a duration/length of the pulsed signal is less than a duration needed to awaken the controller 32, the latching circuit 44 may be used to elongate the pulse signal, or to otherwise process it, into a signal sufficient to transition the controller 32 from the sleep state to the active state. Once the controller 32 is awoken, it may be configured to monitor a voltage at a PROX_D1 node to determine connection of the cordset 22 and an optional analog to digital component (ADC) may be used to support other software processing based on measured voltage.

FIG. 3 illustrates a current path (arrowed lines) through the connection and wake-up signal generating circuits 40, 42 when the cordset 22 is disconnected. The controller 32 presumably is in the sleep state at this point due to a prior shutdown event that transitioned the controller 32 to the sleep state upon detection of the PROX_D1 value indicating disconnection of the cordset 22. The controller 32 may be in the active state to complete or perform other operations or in the process of transitioning to the sleep state while the illustrated current path is active. When the cordset 22 is disconnected, switch Q1 is open, Q19 is closed, Q12 is open, switch Q8 is open, a PROX voltage set by the controller is zero, and a terminal 48 of the vehicle-based receptacle used to receive a proximity pin (not shown) of the cordset 22 is empty. This results in the illustrated current path through Q19, R130, and R33 of the connection circuit 40. The wake-up signal generating circuit 42 has no current path since a voltage on either side of the capacitor C39 is constant.

FIG. 4 illustrates current paths (arrowed lines) through the connection and wake-signal generating circuits 40, 42 when the cordset 22 is initially connected. The controller, unless previously awoken, is in the sleep state at least for a short period of time after connection of the cordset 22. Connection of the cordset 22 results in the proximity pin 49 being inserted within the corresponding terminal receptacle 48 and becoming part of the connection circuit 40. The inserted pin 49 conducts current through the terminal 48 such that resistor R34 becomes connected to a connection node 50 between R130 and R33, effectively lowering a voltage at the connection node 50. The lowered connection node voltage reduces the voltage on one side of the capacitor C39, and thereby, initiates a charging operation of the capacitor C39 with energy from the 5 VDC power supply. The flow of current through the emitter and base of switch Q1 caused by charging of the capacitor C39 transitions switch Q1 from an open to a closed state, resulting in approximately a 5V pulse at a PROX_SET node associated with the collector of switch Q1.

FIG. 5 illustrates a pulsed signal output 54 from the PROX_SET node of the wake-up signal generating circuit 42. The pulsed signal 54 may be characterized as a single pulsed signal having a duration from time T1 to time T2 wherein time T1 corresponds with the charging of capacitor C39 and time T2 corresponds with capacitor C39 becoming charged. The duration between time T1 and time T2 is proportional to a capacitance of the capacitor C39 and can be varied by changing the capacitance. One non-limiting aspect of the present invention contemplates capacitor C39 having a capacitance of less than 150 nF, such as 100 nF, in order to limit its size (a larger capacitor may be more expensive and have a slower rise time). Of course, the present invention fully contemplates the use of any sized capacitor and is not intended to be necessarily limited to the noted capacitances.

The duration of the single pulsed signal output at the PROX_SET node may be less than a duration needed to awaken the controller 32. The PROX_SET signal 54 is illustrated to have a duration of less than 50 mS (shown as 25 mS) whereas the controller 32 may be of the type requiring at least a 50 mS pulse in order to transition from the sleep state to the active state. In order to reduce costs and achieve desired signal rise times, one non-limiting aspect of the present invention contemplates including the latching circuit 44 to elongate the PROX_SET signal 54 instead of simply increasing the size of capacitor C39. FIG. 6 illustrates a pulsed signal output 56 from the latching circuit 44 to awaken the controller 32. The pulsed signal 56 has a longer duration (shown to be up to time T3) than a time Tw needed to awaken the controller 32.

As shown in FIG. 2, the PROX_SET pulse signal 54 may be output from the PROX_SET node to an input of the latching circuit 44. The latching circuit 44 may then elongate the signal or perform other processing to generation a WAKE_UP signal output 56 to the controller 32. Once awoken, the controller 32 may set a LATCH_RESET signal 60 to reset the latching circuit 44 for generation of subsequent WAKE-UP signals 56. The awoken controller 32 may then determine connection of the cordset 22 based the voltage at the connection node. Optionally, the controller 32 may be configured to support two or more connection states, such as to support connection detection voltages required by Society of Automotive Engineer (SAE) J1772 and International Electrotechnical Commission (IEC) 51851. These connection states may be supported by the controller 32 controlling the additional of resistor R177 to the current path through the connection circuit 40.

FIG. 7 illustrates the SAE J1772 connection status by way of resistor R177 being added to the current path with the controller 32 providing a PROX signal to a PROX input to activate switches Q12 and Q8. The PROX signal may be provided by the controller 32 immediately after awakening according to prior software programming. The addition of resistor R177 changes the voltage at the connection node to meet the SAE J1772 requirement. The resulting voltage change then induces a discharging of the capacitor C39 through the 5 VDC power source of the wake-up signal generating circuit 42 in the illustrated current path. In the event the IEC 51851 standard is used, the resistor R177 is not connected in parallel with resistor R130 and the current path through the 5 VDC power source of the wake-up signal resulting from discharging of the capacitor C39 is delayed until removal of the proximity pin from the terminal.

Once the proximity pin 49 is removed from the terminal 48, the controller 32 detects the corresponding voltage change at the connection node 50 and automatically transitions to the sleep state. The transitioning to the sleep state may include removing resistor R177 from the current path with deactivation of the switch Q8. The removal of resistor R177 can be done to reduce current consumption (quiescent current) of the connection circuit 40 to less than 150 uA, and preferably less than 100 uA, depending on the component values remaining in the current path. The ability to control the quiescent current may be beneficial in achieving desired proximity (connection) detection while minimizing energy consumption.

As supported above, the present invention may be configured to: wake up on falling edge of proximity; wake up on edge transitions lower than 1V; achieve low quiescent current operation during sleep mode; facilitate latched wake up to meet minimum startup current requirements of the system; allows for system sleep mode with proximity signal continuously applied; provide selectable SAE/IEC or other settings; automatically switch from SAE to IEC mode during sleep to lower quiescent current consumption; automatic switch from SAE to IEC also allows for improved low voltage wake up response; enter sleep mode (e.g., using controller 32) with proximity applied (steady state); detect change in proximity level as low as 800 mV; and transition at any voltage levels (e.g., 5V to 4V or 3V to 1V etc.).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A proximity detection circuit for use in awakening a microcontroller to perform detection of a connection of a charging cordset to a receptacle of a vehicle charging system, the cordset having a proximity pin that plugs into a terminal of the receptacle when the cordset is connected, the proximity detection circuit comprising:
    a wake-up signal generating circuit operable to generate a wake-up signal for awakening the microcontroller from a sleep state to an active state to perform detection of a connection of the charging cordset to the receptacle; and
    a connection circuit configured to conduct through the pin in order to enable the wake-up signal generating circuit to generate the wake-up signal, wherein the connection circuit is operable between a first state and a second state, the first state corresponding with the connection circuit consuming a first non-zero amount of current and the second state corresponding with the connection circuit consuming a second non-zero amount of current, the second non-zero amount of current greater than the first non-zero amount of current;
    wherein the connection circuit is operable between the first and second state according to controlling signals received from the microcontroller, the microcontroller controlling the connecting circuit to the first state upon determining disconnection of the cordset and to the second state upon determining connection of the cordset.

2. The proximity detection circuit of claim 1 wherein the wake-up signal generating circuit is configured to generate the wake-up signal as a pulsed wake-up signal.

3. The proximity detection circuit of claim 2 wherein a duration of the pulsed wake-up signal is less than a signal duration needed to awaken the microcontroller.

4. The proximity detection circuit of claim 3 further comprising a latching circuit configured to elongate the duration of the pulsed wake-up signal to at least equal the signal duration needed to awaken the microcontroller.

5. The proximity detection circuit of claim 4 wherein the signal duration needed to awaken the microcontroller is at least 50 ms.

6. The proximity detection circuit of claim 2 wherein a duration of the pulsed wake-up signal is less than 50 ms.

7. The proximity detection circuit of claim 2 wherein the wake-up signal generation circuit is configured to include a capacitor operable to set a duration of the pulsed wake-up signal, wherein a capacitance of the capacitor less than 150 nF.

8. The proximity detection circuit of claim 1 wherein the first non-zero amount of current is less than 150 uA.

9. A proximity detection circuit for use in awakening a microcontroller to perform detection of a connection of a charging cordset to a vehicle charging system, the proximity detection circuit comprising:
    a pulse signal generating circuit operable to generate a single-pulsed signal for use in awakening the microcontroller from a sleep state to an active state to perform detection of a connection of the charging cordset to the receptacle upon connection of the charging cordset to the vehicle charging system; and
    a connection circuit configured to enable the pulse signal generating circuit to generate the single-pulsed signal upon connection of the charging cordset to the vehicle charging system, wherein the connection circuit is operable between a first state and a second state, the first state corresponding with the connection circuit consuming a first non-zero amount of current and the second state corresponding with the connection circuit consuming a second non-zero amount of current, the second non-zero amount of current greater than the first non-zero amount of current;
    wherein the connection circuit is operable between the first and second state according to controlling signals received from the microcontroller, the microcontroller controlling the connecting circuit to the first state upon determining disconnection of the cordset and to the second state upon determining connection of the cordset.

10. The proximity detection circuit of claim 9 further comprising a latching circuit configured to elongate the single-pulsed signal into a wake-up signal sufficient to awaken the microcontroller.

11. The proximity detection circuit of claim 9 wherein the pulse signal generating circuit is configured to include a capacitor operable to set a duration of the single-pulsed signal.

12. The proximity detection circuit of claim 11 wherein a capacitance of the capacitor less than 150 nF.

13. The proximity detection circuit of claim 9 wherein the connection circuit includes a voltage divider connected to the pulse generating circuit at a connection node, the voltage divider providing a first voltage at the connection node when the cordset is disconnected and a second voltage when the cordset is connected, the pulse generating circuit requiring the second voltage in order to generate the single-pulsed signal.

14. The proximity detection circuit of claim 13 wherein the connection node coincides with a terminal of the receptacle used to receive a proximity pin of the cordset, wherein the voltage divider is configured to conduct through the pin in order to provide the second voltage.

15. A proximity detection circuit for use in awakening a microcontroller from a sleep state to an active state in order to perform detection of a connection of a charging cordset to a vehicle charging system, the proximity detection circuit comprising:

a pulse signal generating circuit operable to generate a first signal having a first duration;

a latching circuit operable to process the first signal into a second signal having a second duration, the second duration sufficient for awakening the microcontroller from the sleep state to the active state to perform detection of a connection of the charging cordset to the receptacle; and a connection circuit configured to enable the pulse signal generating circuit to generate the first signal upon connection of the charging cordset to the vehicle charging system, wherein the connection circuit is operable between a first state and a second state, the first state corresponding with the connection circuit consuming a first non-zero amount of current and the second state corresponding with the connection circuit consuming a second non-zero amount of current, the second non-zero amount of current being greater than the first non-zero amount of current;

wherein the connection circuit is operable between the first and second state according to controlling signals received from the microcontroller, the microcontroller controlling the connecting circuit to the first state upon determining disconnection of the cordset and to the second state upon determining connection of the cordset.

16. The proximity detection circuit of claim 15 wherein the first duration is insufficient to awaken the microcontroller from the first state to the second state.

17. The proximity detection circuit of claim 15 wherein the connection circuit conducts though a pin of the cordset in order to enable the pulse signal generating circuit.

18. The proximity detection circuit 15 wherein the connection circuit includes a voltage divider connected to the pulse generating circuit at a connection node, the voltage divider providing a first voltage at the connection node when the cordset is disconnected and a second voltage when the cordset is connected, wherein the pulse generating circuit requires the second voltage in order to generate the first signal, and wherein the connection circuit consumes less than 150 uA through the voltage divider when providing the first voltage at the connection node.

* * * * *